Figure 1:
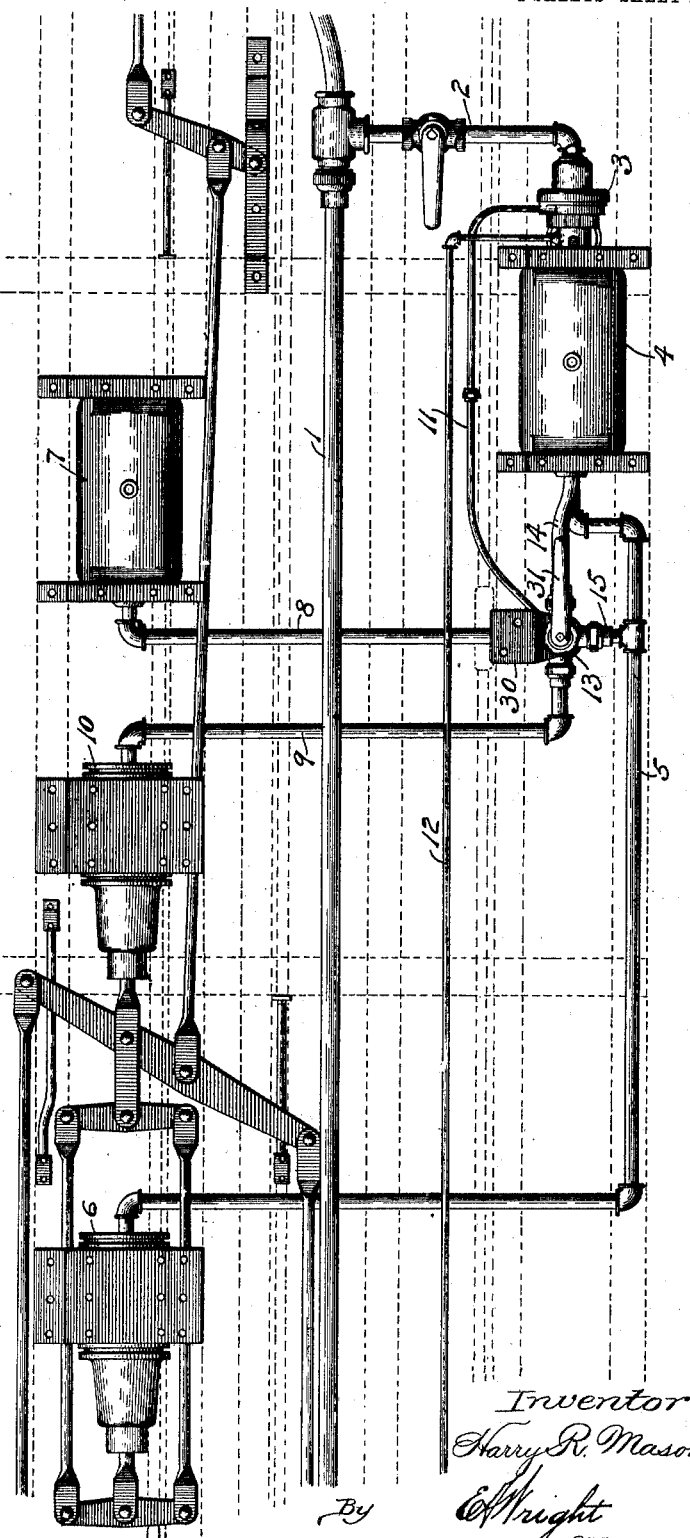

No. 760,465. PATENTED MAY 24, 1904.
H. R. MASON.
FLUID PRESSURE BRAKE.
APPLICATION FILED SEPT. 12, 1902.
NO MODEL. 4 SHEETS—SHEET 1.

Witnesses: Inventor:
Harry R. Mason,
By E. Wright
Attorney

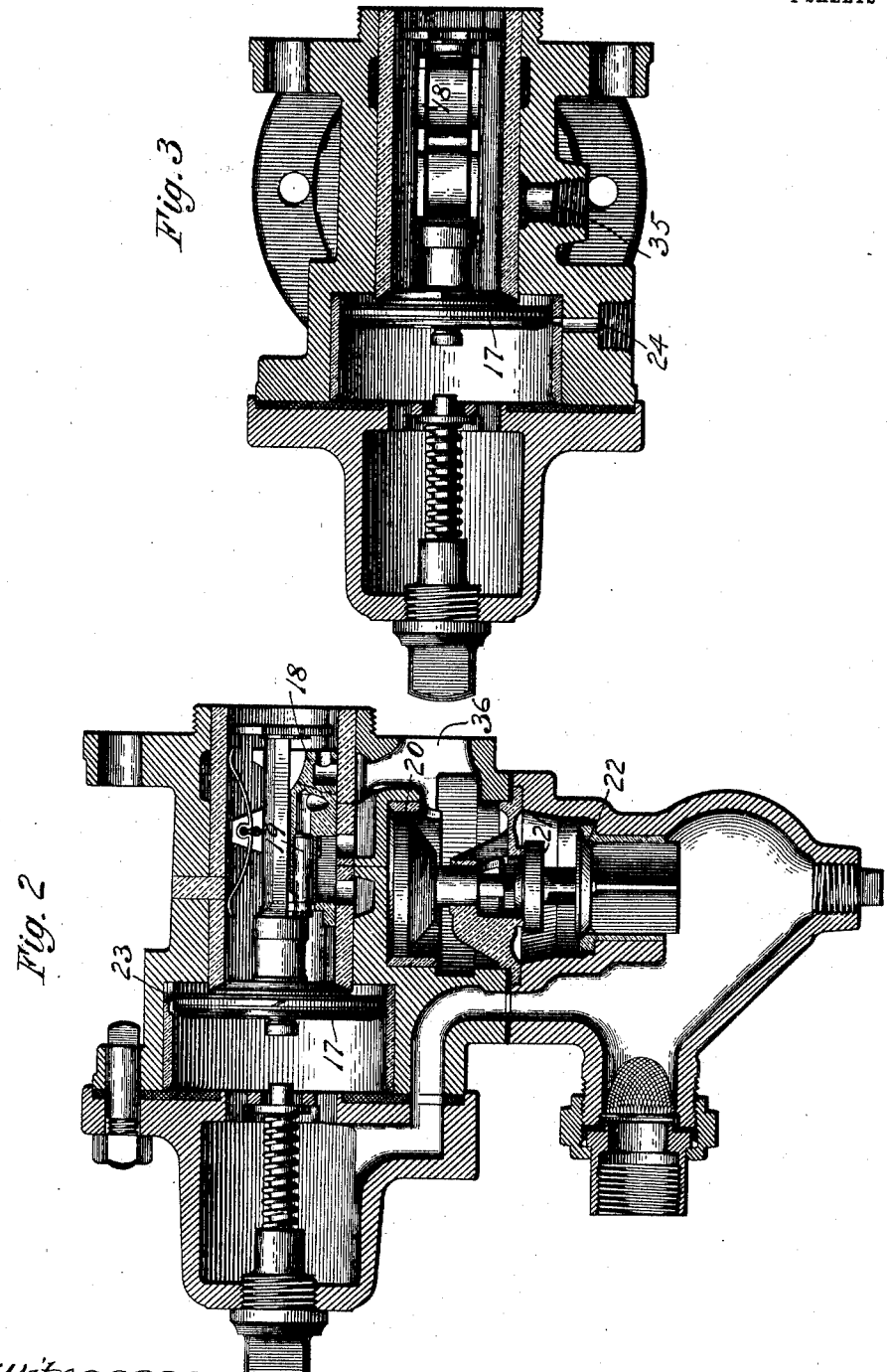

No. 760,465. PATENTED MAY 24, 1904.
H. R. MASON.
FLUID PRESSURE BRAKE.
APPLICATION FILED SEPT. 12, 1902.
NO MODEL. 4 SHEETS—SHEET 3.
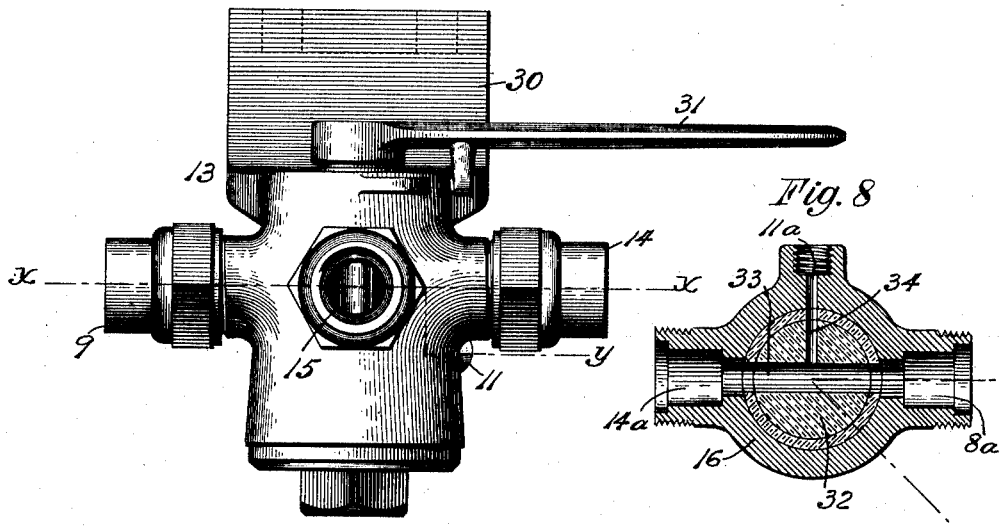
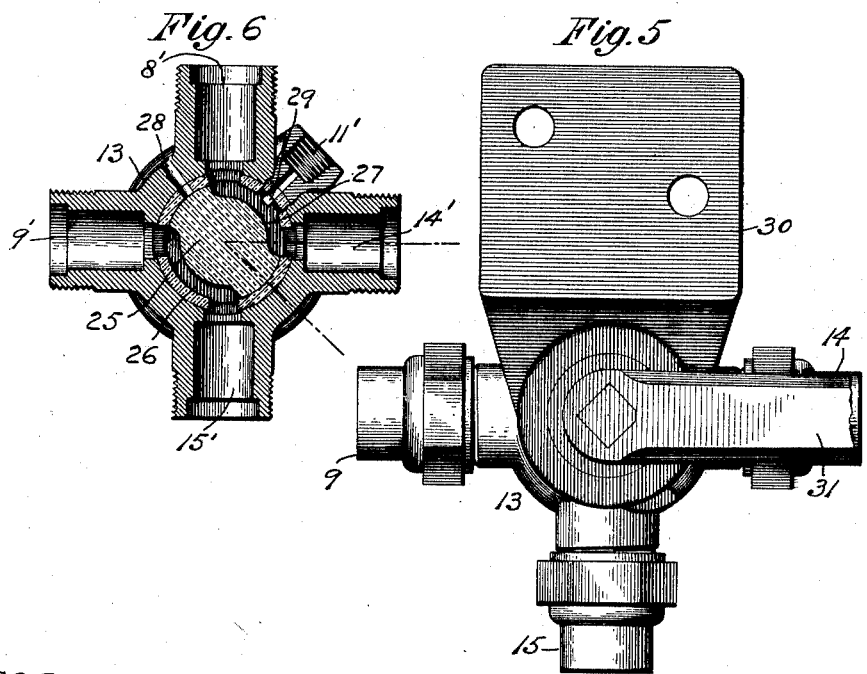
Witnesses:
Inventor:
Harry R. Mason,
By Attorney No. 760,465. PATENTED MAY 24, 1904.
H. R. MASON.
FLUID PRESSURE BRAKE.
APPLICATION FILED SEPT. 12, 1902.
NO MODEL. 4 SHEETS—SHEET 4.

Witnesses:
Inventor:
Harry R. Mason
By E. Wright
Attorney.

No. 760,465. Patented May 24, 1904.

UNITED STATES PATENT OFFICE.

HARRY R. MASON, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 760,465, dated May 24, 1904.

Application filed September 12, 1902. Serial No. 123,145. (No model.)

*To all whom it may concern:*

Be it known that I, HARRY R. MASON, a citizen of the United States, residing at Chicago, county of Cook, State of Illinois, have invented or discovered a certain new and useful Improvement in Fluid-Pressure Brakes, of which improvement the following is a specification.

My invention relates to fluid-pressure brakes.

The present fluid-pressure brake equipment as applied to cars, and more particularly to freight-cars, comprises the usual train-pipe, auxiliary reservoir, triple valve, and brake-cylinder, the reservoir and brake-cylinder being of certain standard sizes and relative capacities to give a predetermined maximum braking effect for any particular type of car. This equipment makes no provision for varying the braking force according to the weight of the car or as between an empty car and a loaded car.

It is a well-known fact that a much greater braking force may be applied to the wheels of a car when it is loaded than when it is light and empty without causing a sliding of the wheels, and in order to secure a maximum braking effect for the cars under all conditions it is necessary to provide means for increasing the braking power on loaded or heavy cars. It has heretofore been proposed to provide an additional or supplemental reservoir for this purpose and which is adapted to be connected with and form part of the auxiliary reservoir when the car is loaded or to be cut off therefrom when the car is empty. This arrangement, however, while it gives an increased reservoir capacity and greater braking power for loaded cars, is open to the objection that the two reservoirs together must be charged from the train-pipe through the feed-groove of the triple valve, which being of proper size to charge the single reservoir is too small to permit the charging of the two reservoirs together with sufficient rapidity.

The object of my invention is to overcome these difficulties; and to this end it consists in the provision of means for securing a more rapid rate of charging the reservoirs when these are connected together for heavy braking than when feeding a single reservoir. Various means within the scope of my invention may be devised for securing this result by varying the size or capacity of feed-passage; but I prefer to provide a second or additional feed-passage, which is to be opened and closed at the same time that the communicating passage between the reservoirs is opened and closed.

Figure 7:
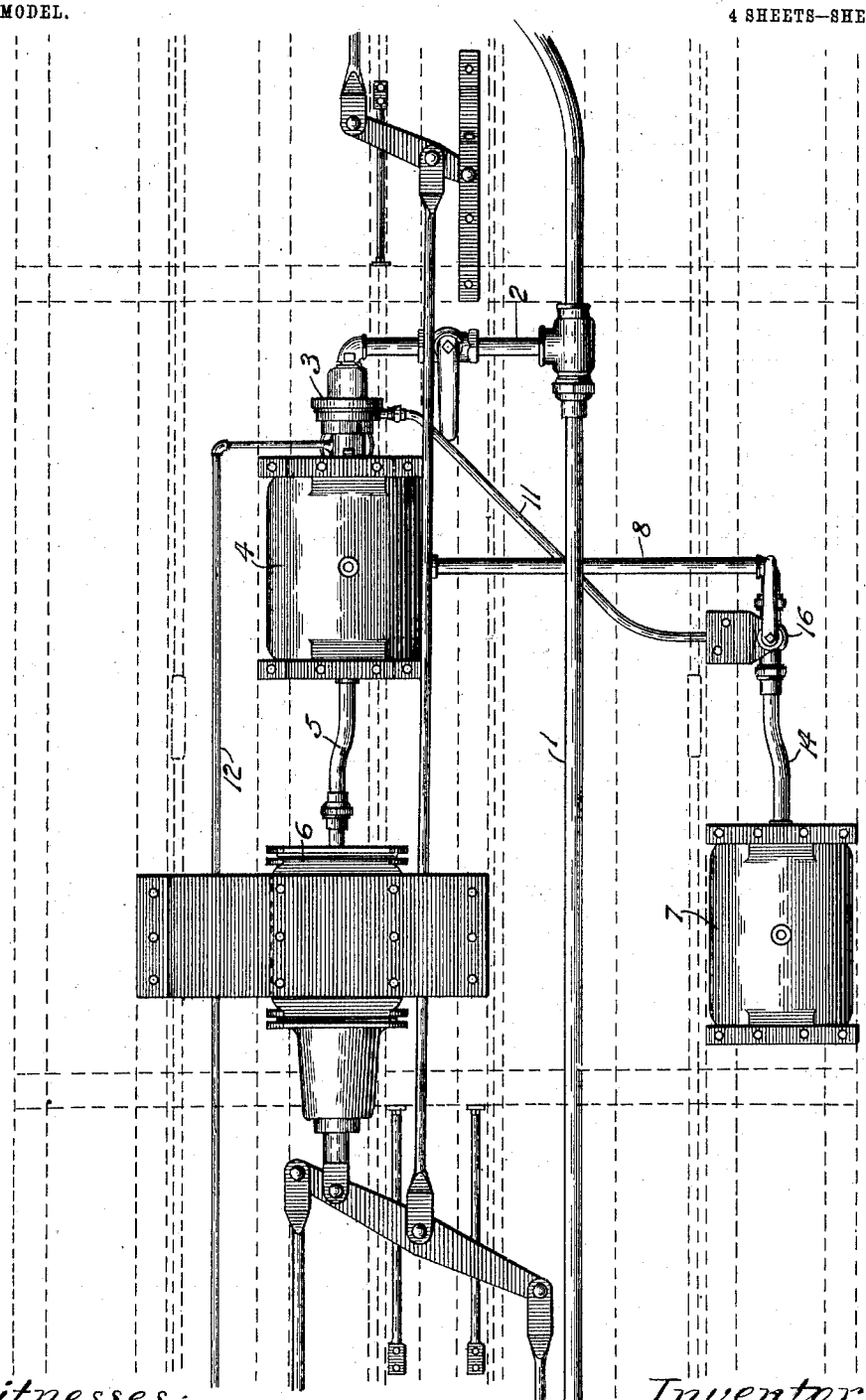

In the accompanying drawings, Figure 1 is a plan view of a fluid-pressure brake equipment embodying one form of my improvement; Fig. 2, a vertical section of the usual form of triple-valve device; Fig. 3, a horizontal section of the same; Fig. 4, a side elevation of one form of a regulating-valve or cut-out cock to be used in connection with my improvement; Fig. 5, a plan view of the same; Fig. 6, a horizontal section of the same, taken mostly on the line $x\ x$ of Fig. 4, but a part being broken away and shown in section on the line $y$; Fig. 7, a plan view of a brake apparatus, showing a modified form of my invention having only one brake-cylinder; and Fig. 8 a horizontal section of a form of regulating-valve or cut-out cock adapted to be used with the construction shown in Fig. 7.

Referring to Fig. 1, the train-pipe 1 is provided with a branch pipe 2, connected to the triple-valve device 3, attached to the auxiliary reservoir 4, and having a pipe 5 leading from the cylinder-port 36 of the triple valve through the reservoir to the brake-cylinder 6, all of which is of the ordinary construction, the brake-cylinder being located some distance from the reservoir. This part of the equipment is all that is in use for light braking upon empty cars; but in order to obtain a greater braking power for the cars when loaded I provide an additional or supplemental reservoir 7, which is connected by a pipe 8 with the regulating valve or cock 13. An additional brake-cylinder 10 may also be provided. The regulating-cock 13 is connected by pipe 14 with the auxiliary reservoir 4, by pipe 9 with the additional brake-cylinder 10, and by pipe 15 with the pipe 5, leading to the usual brake-cylinder 6.

The triple device, as shown in Figs. 2 and 3, is of the usual construction, comprising piston 17, slide-valve 18, graduating-valve 19, brake-cylinder port 36, exhaust-port 35, to which retaining-valve pipe 12 is connected, emergency-piston 20, with emergency-valve 21, and check-valve 22, the ordinary feed groove or passage 23 being provided in the bushing around the triple-valve piston. This feed-passage is made of a certain size or capacity to properly charge the single auxiliary reservoir from the train-pipe in a stated time and also secure a certain action or movement of the triple-valve piston for given variation of fluid-pressure upon its opposite sides. When the capacity of the auxiliary reservoir is increased for heavy braking by connecting the same with an additional or supplemental reservoir, the capacity of the feed-passage 23 will be inadequate to properly charge the reservoirs within the given time, and according to my invention I provide means for increasing the capacity of the feed-passage when the reservoirs are connected together, thus increasing the capacity of the auxiliary reservoir and securing an increased braking power. This additional feeding or charging capacity is preferably obtained by means of an additional feed-passage on pipe 11, which is connected at one end to the piston-chamber of the triple valve by a port 24, just in the rear of the piston when in its release position. The other end of this feed-pipe may be connected to the reservoirs at any point; but I prefer to connect the same to the regulating-valve or cut-out cock 13 in order that a single valve may be used for controlling the feed-passage and the communication between the reservoirs.

As shown more particularly in Figs. 4, 5, and 6, the regulating-valve comprises a body portion 13, having ports or nozzles 8', 9', 11', 14', and 15' for connecting with pipes 8, 9, 11, 14, and 15, respectively, and an exhaust-port 28. The plug-cock 25 is provided with ports or passages 26 and 27, adapted to connect pipes 15 and 9 and pipes 8 and 14, respectively, when in loaded-car position, as shown in Fig. 6. The nozzle 11' is located below the plane of the other nozzles and communicates by a port 29 in the plug-cock with the passage 27, pipes 8 and 14, and thus with the two reservoirs, as shown, when they are in communication with each other. A handle 31, having an angular movement of about forty-five degrees, is secured to the plug 25, and the casing may be provided with a bracket 30 for attaching same to the car. When the handle of the regulating valve or cock is turned to its other or empty-car position, as indicated by dotted lines in Fig. 6, communication between the reservoirs is cut off, as is also that from the auxiliary reservoir 4 to the additional brake-cylinder 10, which is now in communication with the atmosphere through passage 26 and exhaust-port 28. The additional feed passage or pipe 11 is closed at port 11', since the port 29 in the plug-cock has been moved, and the pipe 8 is also closed, thus retaining whatever pressure there may be in the additional reservoir 7. These are the conditions for light braking in which only the standard auxiliary reservoir 4 and brake-cylinder 6 are employed, the relative capacities of these being properly proportioned to give only the maximum braking power desired for empty cars. When the cars are loaded, the regulating-valves are set in loaded-car position, thus connecting the two reservoirs, opening the additional feed-passage for charging the same, and opening the pipe connection to the additional brake-cylinder, whereby a greatly-increased maximum braking power may be obtained.

According to the modification shown in Fig. 7 the additional brake-cylinder and its connections are dispensed with and the regulating-valve 16 controls the communication between the auxiliary and supplemental reservoirs and opens and closes the additional feed-pipe 11. This valve 16 may be constructed, as shown in Fig. 8, with ports or nozzles $8^a$, $11^a$, and $14^a$ for connection with pipes 8, 11, and 14, respectively, the plug 32 having a through-passage 33 and a port 34 at right angles thereto for connecting the additional feed-pipe 11 with the reservoirs when the valve is open, as shown in the drawings. When the car is empty and light braking is desired, the regulating-valve 16 is turned about forty-five degrees, so that all ports are blanked, thus cutting off communication from the additional reservoir to the auxiliary reservoir and also closing the additional feed-passage. The operation of this form of my improvement is substantially the same as that before described, except that the increased braking pressure due to the increased reservoir capacity is all exerted in one brake-cylinder instead of two. It will be observed that but a single triple-valve device is used in connection with my improved apparatus, and this is an important advantage, since the triple valve is an intricate and delicate mechanism, and consequently very expensive to manufacture and liable to get out of order.

My invention is not limited to the particular form of apparatus shown and described, but covers broadly any brake apparatus having means for varying the capacity of both the auxiliary reservoir and the feed device for charging the same.

Having now described my invention, what I claim as new, and desire to secure by Letters Patent, is—

1. In a fluid-pressure brake, the combination with a train-pipe, auxiliary reservoir, triple valve and brake-cylinder, of an additional or supplementary reservoir, means for opening and closing communication between said reservoirs, and means for securing a more rapid rate of charging the reservoirs from the train-pipe when communication between the reservoirs is open.

2. In a fluid-pressure brake, the combination with a train-pipe, auxiliary reservoir, triple valve and brake-cylinder, of an additional or supplemental reservoir adapted to be connected to or disconnected from the auxiliary reservoir, and means for varying the capacity of the feed-passage for charging the reservoirs.

3. In a fluid-pressure brake, the combination with a train-pipe, auxiliary reservoir, triple valve and brake-cylinder, of means for increasing the capacity of the reservoir and the passage for feeding or charging the same.

4. In a fluid-pressure brake, the combination with a train-pipe, auxiliary reservoir, triple valve and brake-cylinder, of an additional or supplemental reservoir, and means for establishing communication between the reservoirs and simultaneously increasing the capacity of the feed-passage for charging the reservoirs.

5. In a fluid-pressure brake, the combination with a train-pipe, auxiliary reservoir, triple valve and brake-cylinder, of an additional reservoir adapted to be connected to or disconnected from the auxiliary reservoir, and an additional feed-passage regulated by the triple valve for the additional reservoir with means for opening and closing the same.

6. In a fluid-pressure brake, the combination with a train-pipe, auxiliary reservoir, triple valve and brake-cylinder, of means for simultaneously varying the capacity of the reservoir and the feed-passage for charging the same.

7. In a fluid-pressure brake, the combination with a train-pipe, auxiliary reservoir, triple valve and brake-cylinder, of an additional or supplemental reservoir adapted to be connected to or disconnected from the auxiliary reservoir, and an additional feed-passage for charging the supplemental reservoir and adapted to be closed when the triple-valve piston moves from its release position.

8. In a fluid-pressure brake, the combination with a train-pipe, auxiliary reservoir, triple valve and brake-cylinder, of an additional or supplemental reservoir, a valve for opening and closing communication between said reservoirs, an additional feed-passage regulated by the triple valve for charging said supplemental reservoir and a cock or valve for opening and closing said passage.

9. In a fluid-pressure brake, the combination with a train-pipe, auxiliary reservoir, triple valve and brake-cylinder, of an additional or supplemental reservoir, an additional feed-passage regulated by the triple valve for charging said supplemental reservoir, and a valve for opening and closing said feed-passage and communication between the reservoirs.

10. In a fluid-pressure brake, the combination with a train-pipe, a triple valve, a plurality of reservoirs and brake-cylinders, of a plurality of feed-passages for said reservoirs, a valve for controlling communication between said reservoirs and between said brake-cylinders and means for opening and closing one of the feed-passages.

In testimony whereof I have hereunto set my hand.

HARRY R. MASON.

Witnesses:
  PAUL CARPENTER,
  RALPH W. HICKS.